US012718509B2

(12) United States Patent
Suzaki

(10) Patent No.: US 12,718,509 B2
(45) Date of Patent: Aug. 25, 2026

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Wataru Suzaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 199 days.

(21) Appl. No.: 18/641,959

(22) Filed: Apr. 22, 2024

(65) Prior Publication Data

US 2024/0362878 A1 Oct. 31, 2024

(30) Foreign Application Priority Data

Apr. 28, 2023 (JP) ................................ 2023-074205

(51) Int. Cl.
*G06T 19/20* (2011.01)
*G06T 15/20* (2011.01)

(52) U.S. Cl.
CPC ............ *G06T 19/20* (2013.01); *G06T 15/205* (2013.01); *G06T 2200/24* (2013.01); *G06T 2219/2016* (2013.01); *G06T 2219/2021* (2013.01)

(58) Field of Classification Search
CPC ... G06T 19/20; G06T 15/205; G06T 2200/24; G06T 2219/2016; G06T 2219/2021; G06T 19/003; G06T 15/20
See application file for complete search history.

(56) References Cited

U.S. PATENT DOCUMENTS

2013/0210524 A1* 8/2013 Otani .................. A63F 13/5258 463/33
2015/0154051 A1* 6/2015 Kruglick ............... A63F 13/355 345/522
2019/0394442 A1* 12/2019 Kawahara ............. G06T 15/205

FOREIGN PATENT DOCUMENTS

JP 2012063958 A 3/2012

* cited by examiner

*Primary Examiner* — Chong Wu
(74) *Attorney, Agent, or Firm* — Canon U.S.A., Inc. IP Division

(57) ABSTRACT

An information processing apparatus receives, while a first virtual viewpoint image generated based on first three-dimensional shape data corresponding to a structure is displayed on a user display unit, a user operation on a first virtual camera corresponding to the first virtual viewpoint image, and generates, based on the user operation, camera parameters indicating a position and an orientation of a second virtual camera corresponding to a second virtual viewpoint image generated based on second three-dimensional shape data indicating a shape of the structure different from a shape indicated by the first three-dimensional shape data.

9 Claims, 14 Drawing Sheets

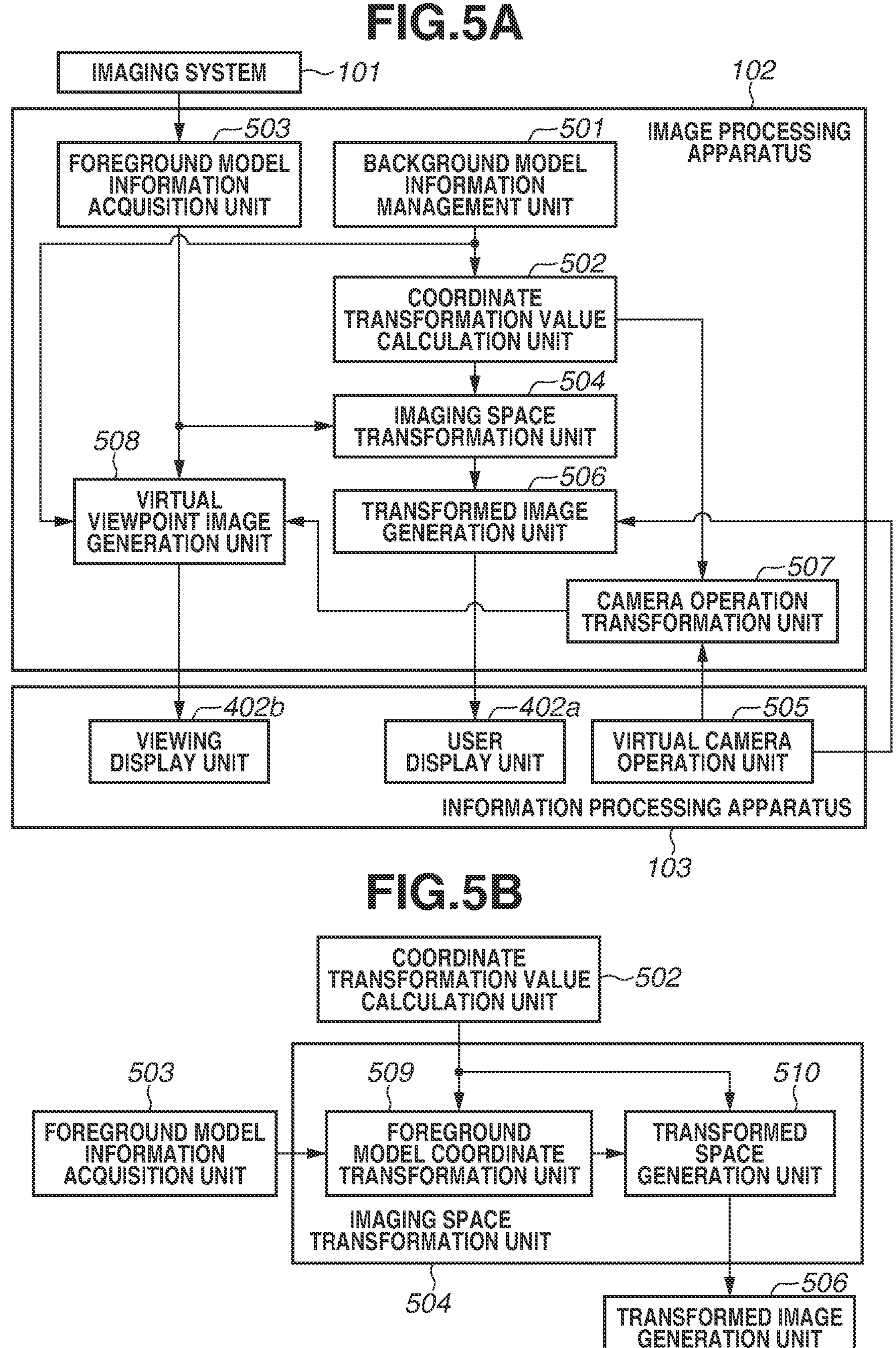
FIG.5A
IMAGING SYSTEM
101
102
IMAGE PROCESSING APPARATUS
503
FOREGROUND MODEL INFORMATION ACQUISITION UNIT
501
BACKGROUND MODEL INFORMATION MANAGEMENT UNIT
502
COORDINATE TRANSFORMATION VALUE CALCULATION UNIT
504
IMAGING SPACE TRANSFORMATION UNIT
508
VIRTUAL VIEWPOINT IMAGE GENERATION UNIT
506
TRANSFORMED IMAGE GENERATION UNIT
507
CAMERA OPERATION TRANSFORMATION UNIT
402b
VIEWING DISPLAY UNIT
402a
USER DISPLAY UNIT
505
VIRTUAL CAMERA OPERATION UNIT
INFORMATION PROCESSING APPARATUS
103
FIG.5B
COORDINATE TRANSFORMATION VALUE CALCULATION UNIT
502
503
FOREGROUND MODEL INFORMATION ACQUISITION UNIT
509
FOREGROUND MODEL COORDINATE TRANSFORMATION UNIT
510
TRANSFORMED SPACE GENERATION UNIT
IMAGING SPACE TRANSFORMATION UNIT
504
506
TRANSFORMED IMAGE GENERATION UNIT

FIG.8

| DEFORMED BACKGROUND MODEL ID | REFERENCE INFORMATION | | | DEFORMED SHAPE INFORMATION | | | |
|---|---|---|---|---|---|---|---|
| | REFERENCE LINE | STARTING LINE | REFERENCE SURFACE | SHAPE INFORMATION | | LINE LENGTH RATIO | |
| | | | | REFERENCE LINE DEFORMATION | REFERENCE SURFACE DEFORMATION | TANGENT DIRECTION | NORMAL DIRECTION |
| TRACK_A VELODROME | SPRINTERS LINE | START LINE | TRACK UPPER SURFACE | STRAIGHT LINE | Z' = 0 | 0.8 | 1.0 |

601
602
603
202a
202b
202c
202d
x
y
z

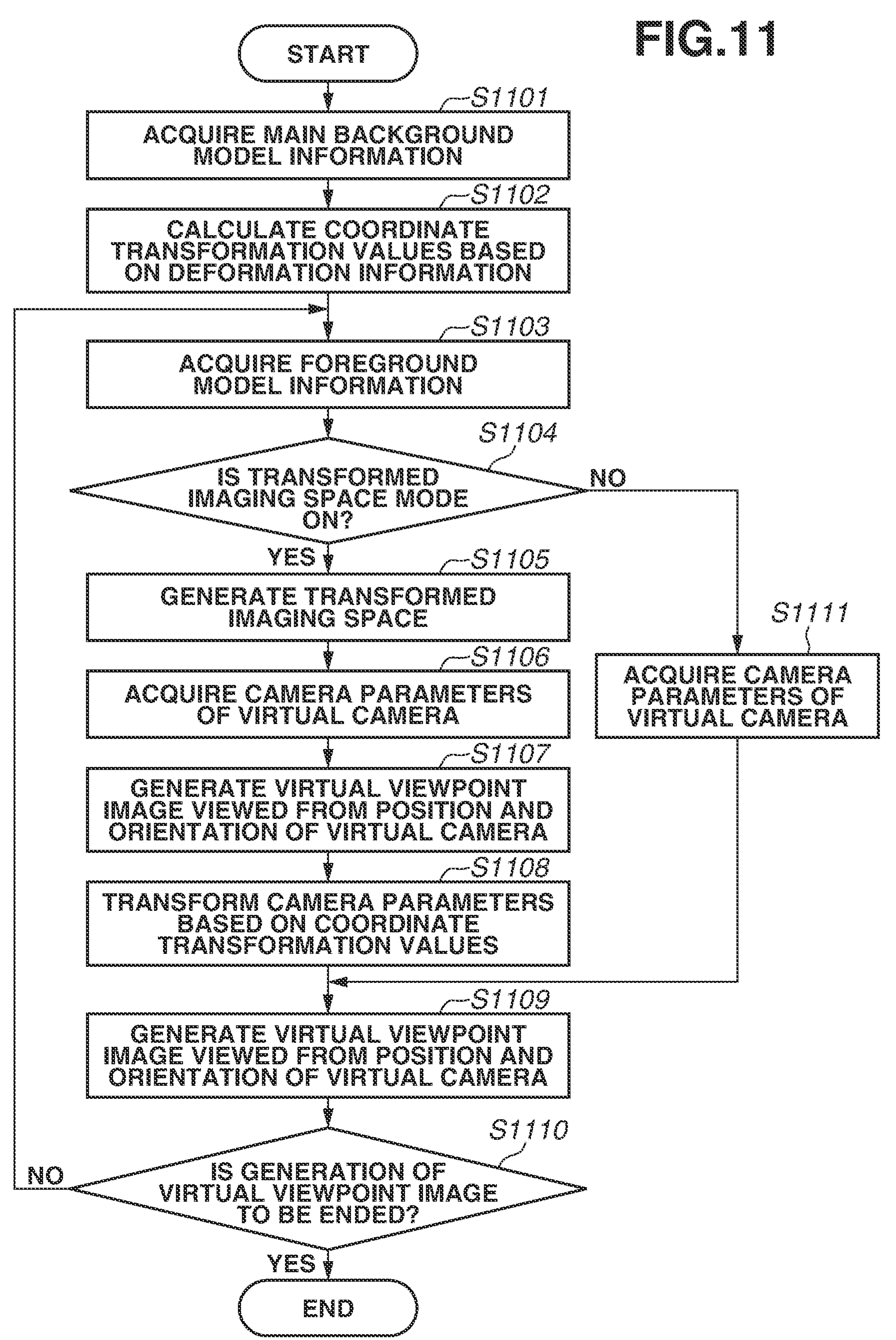
FIG.11
START
S1101
ACQUIRE MAIN BACKGROUND MODEL INFORMATION
S1102
CALCULATE COORDINATE TRANSFORMATION VALUES BASED ON DEFORMATION INFORMATION
S1103
ACQUIRE FOREGROUND MODEL INFORMATION
S1104
IS TRANSFORMED IMAGING SPACE MODE ON?
NO
YES
S1105
GENERATE TRANSFORMED IMAGING SPACE
S1106
ACQUIRE CAMERA PARAMETERS OF VIRTUAL CAMERA
S1107
GENERATE VIRTUAL VIEWPOINT IMAGE VIEWED FROM POSITION AND ORIENTATION OF VIRTUAL CAMERA
S1108
TRANSFORM CAMERA PARAMETERS BASED ON COORDINATE TRANSFORMATION VALUES
S1111
ACQUIRE CAMERA PARAMETERS OF VIRTUAL CAMERA
S1109
GENERATE VIRTUAL VIEWPOINT IMAGE VIEWED FROM POSITION AND ORIENTATION OF VIRTUAL CAMERA
S1110
IS GENERATION OF VIRTUAL VIEWPOINT IMAGE TO BE ENDED?
NO
YES
END 1201b
1202
1201a
601
202
x
y
z 1202
1203a
601
1203b
202
x
y
z

INFORMATION PROCESSING APPARATUS, INFORMATION PROCESSING METHOD, AND STORAGE MEDIUM

BACKGROUND

Field

The present disclosure relates to a technique for generating a virtual viewpoint image.

Description of the Related Art

There is a technique for generating an image (a virtual viewpoint image) representing a view from a virtual viewpoint (a virtual camera) specified by an operation of a user using a plurality of captured images, where the plurality of captured images is obtained by synchronous imaging of a plurality of imaging apparatuses installed at positions different from one another. In generating a virtual viewpoint image, the user chronologically and continuously sets the position and the orientation of a new virtual viewpoint by operating a joystick while referring to a generated virtual viewpoint image corresponding to the virtual camera capturing, for example, a desired object (subject). The thus set movement path of the virtual camera is generally termed a "camera path". The user can move the virtual camera in the entirety of a three-dimensional space as an imaging target. However, for example, in a case where a person as an object runs on a structure having a complex shape, the user needs to give consideration so that the virtual camera does not unnaturally move in relationship to the structure. Japanese Patent Application Laid-Open No. 2012-063958 discusses a technique for, in a case where the movement position of a virtual camera overlaps an obstacle (an entry prohibition area) such as a wall of a building, correcting the movement position of the virtual camera to be located outside the obstacle.

SUMMARY

According to an aspect of the present disclosure, an information processing apparatus includes one or more memories storing instructions, and one or more processors executing the instructions to receive, while a first virtual viewpoint image generated based on first three-dimensional shape data corresponding to a structure is displayed, a user operation on a first virtual camera corresponding to the first virtual viewpoint image, and generate, based on the user operation, camera parameters indicating a position and an orientation of a second virtual camera corresponding to a second virtual viewpoint image generated based on second three-dimensional shape data indicating a shape of the structure different from a shape indicated by the first three-dimensional shape data.

Further features of the present disclosure will become apparent from the following description of exemplary embodiments with reference to the attached drawings.

BRIEF DESCRIPTION OF THE DRAWINGS

FIGS. 5A and 5B are diagrams illustrating a functional configuration of the image processing apparatus.

FIG. 8 is a diagram illustrating deformation information.

FIG. 11 is a flowchart illustrating processing of generating a virtual viewpoint image using a transformed imaging space.

DESCRIPTION OF THE EMBODIMENTS

Figure 1:
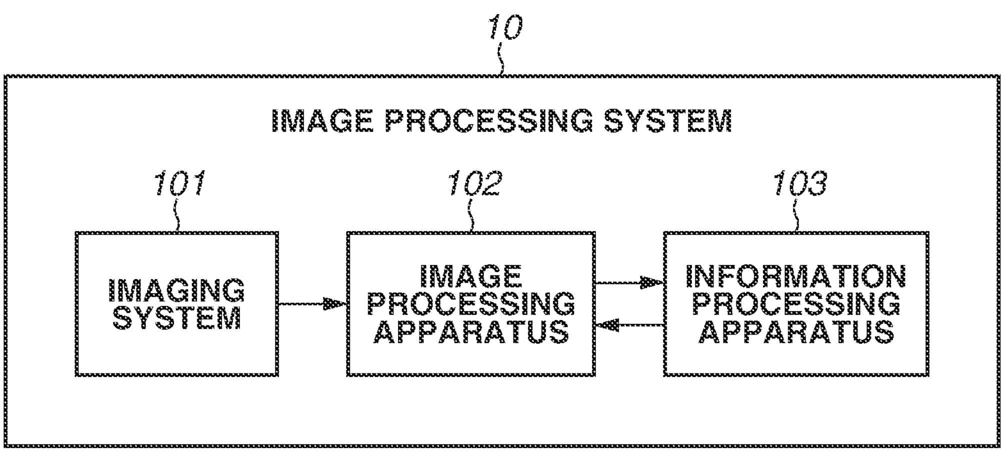
FIG. 1 is a diagram illustrating a configuration of an image processing system.

Exemplary embodiments will be described below with reference to the accompanying drawings. The configurations illustrated in the following exemplary embodiments are merely examples, and the present disclosure is not limited to the configurations illustrated in the figures. Not all the combinations of the features described in the present exemplary embodiments are essential for a method for solving the issues in the present disclosure.

Review of Issue

For example, a case is considered where a virtual viewpoint image is generated with soccer played on a broad and flat field as a target. For example, a user can set a camera path in an imaging space with a high degree of freedom, where an example of the camera path starts tracking a player from the position at which the player is captured from behind, and comes around to the position at which the player is captured from the front at the timing when a ball is kicked toward a goal by the player. The "imaging space" means a virtual three-dimensional space (a virtual space) corresponding to a three-dimensional space where a plurality of imaging apparatuses captures images in actuality and represented by computer graphics. In contrast, for example, a case is considered where a virtual viewpoint image is generated with bicycle track cycling as a target. In the bicycle track cycling, a cyclist cycles on a lap course having continuously connected curved sections with a maximum bank of 30 degrees to 45 degrees and flat straight sections. Such a lap course is generally called a track. In such a case, it is difficult to set a natural camera path even with the technique in Japanese Patent Application Laid-Open No. 2012-063958. For example, assume that a camera path that runs side by side with the cyclist cycling laps on the track is set with application of the technique in Japanese Patent Application Laid-Open No. 2012-063958. In such a case, at the stage where the cyclist enters any of the curved sections, the angle of the bank of the track surface gradually increases according to the movement of a virtual viewpoint running side by side with the cyclist. Then, every time the position of a virtual camera and an entry prohibition area overlap each other, the position of the virtual viewpoint is corrected. In the thus obtained camera path, the virtual viewpoint draws a zig-zag trajectory up and down according to the movement of the cyclist, and a sufficiently viewable virtual viewpoint image cannot be obtained. At the stage where the cyclist comes out of the curved section, the angle of the bank of the track surface gradually becomes gentle according to the movement of the cyclist, and the position of the virtual camera and the entry prohibition area do not overlap each other. Thus, the position of the virtual viewpoint is not corrected at all. In the thus obtained camera path, the distance between the virtual viewpoint and the track surface gradually increases. To avoid this, a delicate operation for maintaining the virtual viewpoint at a constant height from the track surface of which the height gradually changes is required. Thus, the burden on the user increases.

As described above, in traditional art, setting a natural camera path without giving a sense of discomfort involves an operation on a complex virtual viewpoint in a case where, for example, an object moves on a structure having a complex three-dimensional shape such as a track. In view of this, the technique of the present disclosure is directed to enabling the setting of a natural camera path through a simple operation.

<System Configuration>

FIG. 1 is a diagram illustrating the configuration of the entirety of an image processing system.

An image processing system 10 includes an imaging system 101, an image processing apparatus 102, and an information processing apparatus 103. The image processing system 10 can generate a virtual viewpoint image.

The imaging system 101 installs a plurality of imaging apparatuses at positions different from each other around an imaging area and performs imaging in a time synchronization manner. The imaging system 101 transmits a plurality of images synchronously captured from multiple viewpoints to the image processing apparatus 102. Example of the The imaging area include an imaging studio where imaging for generating a virtual viewpoint image is performed, a sports stadium where a sporting competition is held, and a stage where an acting performance is given. In the present exemplary embodiment, a plurality of imaging apparatuses is installed at positions different from each other around a velodrome, and imaging is performed in a time synchronization manner.

The image processing apparatus 102 generates a virtual viewpoint image viewed from a virtual camera (a virtual viewpoint) based on the plurality of images captured from the multiple viewpoints. The "virtual camera" refers to a virtual camera capable of freely moving in an imaging space. The virtual camera is represented by camera parameters determined by the information processing apparatus 103. The following description is provided on the assumption that the word "image" includes the concepts of both a moving image and a still image, unless otherwise noted. That is, the image processing system 10 can process both a still image and a moving image.

The image processing apparatus 102 extracts a subject as a foreground from the plurality of captured images sent from the imaging system 101 and generates a foreground model from an image of the extracted foreground. Examples of the method for extracting the foreground include a method using background subtraction information. Specifically, an image with the foreground not being present is captured as a background image in advance, and the difference between an image with the foreground and the background image is calculated. If the difference value is greater than a threshold, it is determined that the position of a pixel having the difference value is the foreground. Although examples of the technique for extracting the foreground include a variety of other techniques such as techniques using a feature amount on an image regarding the subject and machine learning, the technique for extracting the foreground does not matter in the present exemplary embodiment. The foreground model may be generated using a volume intersection method, or may be generated using depth data obtained by stereo image processing. In the present exemplary embodiment, the method for generating the foreground model is not limited. The image processing apparatus 102 generates an imaging space where the foreground model and a background model are arranged, and generates a virtual viewpoint image viewed from the virtual camera. In the present exemplary embodiment, the background model is data indicating a structure, such as a studio set and the field of a sports stadium, captured in advance. As the method for generating the virtual viewpoint image, for example, model-based rendering (MBR) is useable. This processing enables generation of the virtual viewpoint image viewed from the position and the orientation of the virtual camera. The method for generating the virtual viewpoint image is not limited to this.

The information processing apparatus 103 controls the virtual camera and determines camera parameters indicating the viewpoint of the virtual camera. The camera parameters of the virtual camera include parameters for specifying the position, the orientation, the focal length, the zoom, and the time. The position of the virtual camera specified by the camera parameters is represented by three-dimensional coordinates with the origin at a predetermined position. The position specified by the camera parameters of the virtual camera is represented by parameters (x, y, z) along three axes, namely an x-axis, a y-axis, and a z-axis. The orientation of the virtual camera specified by the camera parameters includes parameters (rx, ry, rz) along three axes, namely pan, tilt, and roll axes. The camera parameters may include parameters defining other elements, or may exclude some of all the above parameters. In the present exemplary embodiment, an operator of the virtual camera is referred to as a "user", and a viewer views a generated virtual viewpoint image.

The information processing apparatus 103 transmits the determined camera parameters of the virtual camera to the image processing apparatus 102. Next, the image processing apparatus 102 generates a virtual viewpoint image based on the received camera parameters and transmits the generated virtual viewpoint image to the information processing apparatus 103.

<Description of Imaging Space>

In the present exemplary embodiment, two imaging spaces, namely a main imaging space (a first virtual space) a transformed imaging space (a second virtual space), are generated. The main imaging space includes a three-dimensional shape generated from a plurality of images acquired by the plurality of imaging apparatuses capturing reality. The transformed imaging space is used for facilitating an operation on the virtual camera in the main imaging space. The virtual camera is operated in the transformed imaging space having a structure generated by changing the shape of a structure included in the main imaging space and having a complex three-dimensional shape, such as a track in a velodrome, to a simple shape, which enables the setting of a natural camera path with a simpler operation.

Figure 2A:
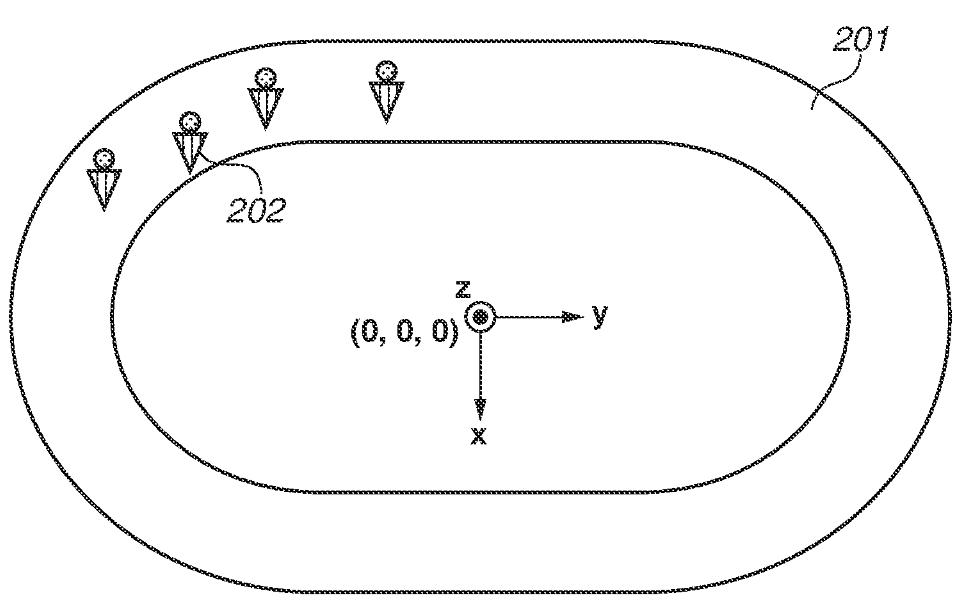
FIGS. 2A and 2B are diagrams illustrating a world coordinate system and a camera coordinate system in a virtual space.
Figure 2B:
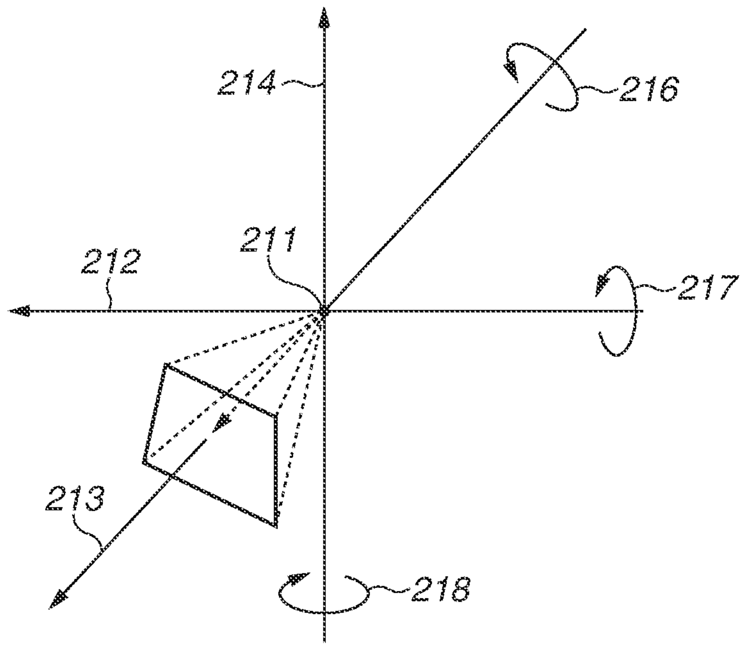

FIGS. 2A and 2B are diagrams illustrating a world coordinate system and a camera coordinate system in the main imaging space. The transformed imaging space also has a world coordinate system and a camera coordinate system similar to the world coordinate system and the camera coordinate system, respectively, in the main imaging space described below.

FIG. 2A is a diagram illustrating a world coordinate system (x, y, z) in the main imaging space. The world coordinate system is used to represent the camera parameters of the virtual camera and the positions of a foreground model and a background model. In the present exemplary embodiment, an image of a bicycle race is captured, the three-dimensional shape of a subject included in the captured image is generated, and a virtual viewpoint image is generated using the generated three-dimensional shape. The "subject" refers to a tangible object present in the imaging space, such as a field 201 of a sports stadium and a cyclist 202. The center of the field 201 is an origin (0, 0, 0) of the world coordinate system. An x-axis is the short side direction of the field 201, a y-axis is the long side direction of the field 201, and a z-axis is a direction vertical to the field 201. The method for setting the world coordinate system is not limited to this.

FIG. 2B is a diagram illustrating a camera coordinate system (X, Y, Z) of the virtual camera. The camera coordinate system is represented by an origin 211 and an orthogonal coordinate system (X, Y, Z) along three axes, namely an X-axis 212, a Y-axis 213, and a Z-axis 214. The X-axis 212, the Y-axis 213, and the Z-axis 214 are axes in a left-right direction, a front-back direction, and a height direction, respectively, of the virtual camera. Tilt 217, roll 216, and pan 218 indicating the orientation of the virtual camera are represented by angles about the X-axis 212, the Y-axis 213, and the Z-axis 214, respectively, as rotational axes.

<Hardware Configuration>

Figure 3:
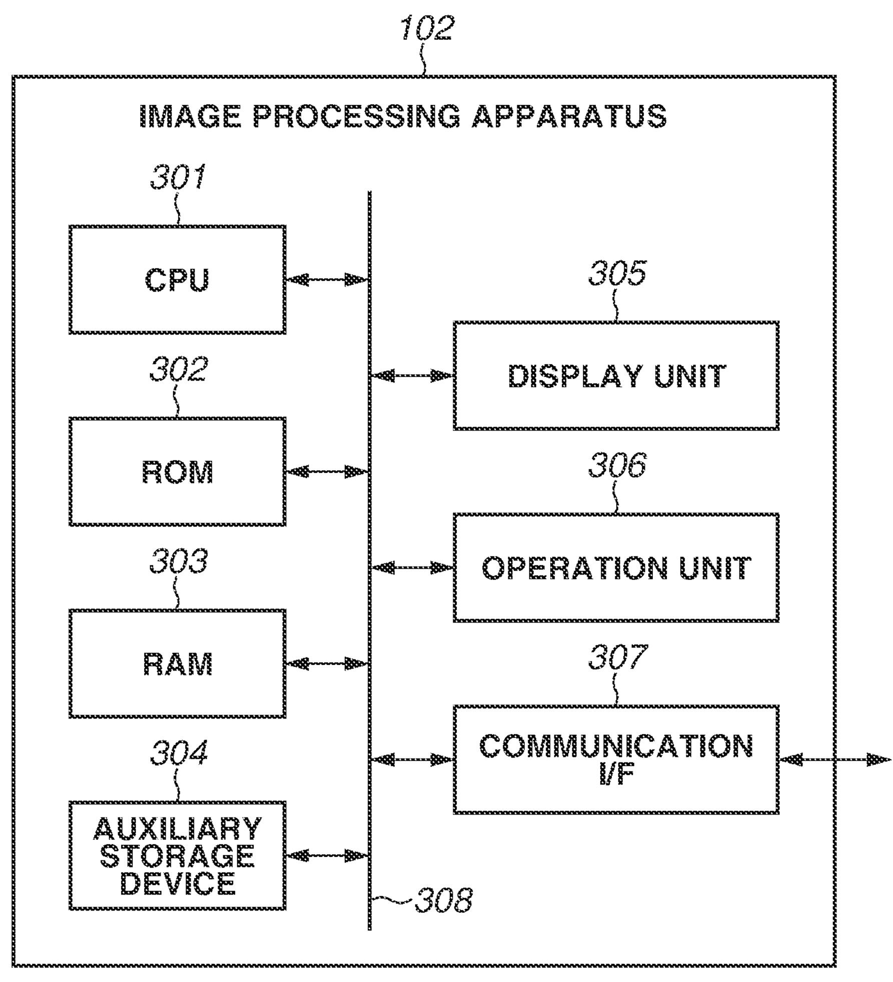
FIG. 3 is a diagram illustrating a hardware configuration of an image processing apparatus.

FIG. 3 is a diagram illustrating the hardware configuration of the image processing apparatus 102. The hardware configuration of the information processing apparatus 103 is also similar to the configuration of the image processing apparatus 102. The image processing apparatus 102 includes a central processing unit (CPU) 301, a read-only memory (ROM) 302, a random-access memory (RAM) 303, an auxiliary storage device 304, a display unit 305, an operation unit 306, a communication interface (I/F) 307, and a bus 308.

The CPU 301 controls the entirety of the image processing apparatus 102 using a computer program and data stored in the ROM 302 or the RAM 303, thus implementing the functions of the image processing apparatus 102 illustrated in FIG. 1. The image processing apparatus 102 may include one or more dedicated hardware devices different from the CPU 301, and the dedicated hardware devices may execute at least a part of the processing of the CPU 301. Examples of the dedicated hardware include an application-specific integrated circuit (ASIC), a field-programmable gate array (FPGA), and a digital signal processor (DSP).

The ROM 302 stores a program that does not need to be changed.

The RAM 303 temporarily stores a program and data supplied from the auxiliary storage device 304 and data supplied from outside via the communication I/F 307.

The auxiliary storage device 304 includes, for example, a hard disk drive and stores various pieces of data such as image data and sound data.

The display unit 305 includes, for example, a liquid crystal display or a light-emitting diode (LED) and displays a graphical user interface (GUI) for the user to operate the image processing apparatus 102.

The operation unit 306 includes, for example, a keyboard, a mouse, a joystick, and a touch panel. The operation unit 306 receives operations of the user and inputs various instructions to the CPU 301. The CPU 301 operates as a display control unit that controls the display unit 305, and an operation control unit that controls the operation unit 306.

The communication I/F 307 is used to communicate with an external apparatus of the image processing apparatus 102. For example, in a case where the image processing apparatus 102 is connected to the external apparatus by wire, a cable for communication is connected to the communication I/F 307. In a case where the image processing apparatus 102 has the function of wirelessly communicating with the external apparatus, the communication I/F 307 includes an antenna.

The bus 308 connects the components of the image processing apparatus 102 and transmits information.

While the display unit 305 and the operation unit 306 are present inside the image processing apparatus 102 in the present exemplary embodiment, at least one of the display unit 305 and the operation unit 306 may be present as a separate apparatus outside the image processing apparatus 102.

Figure 4:
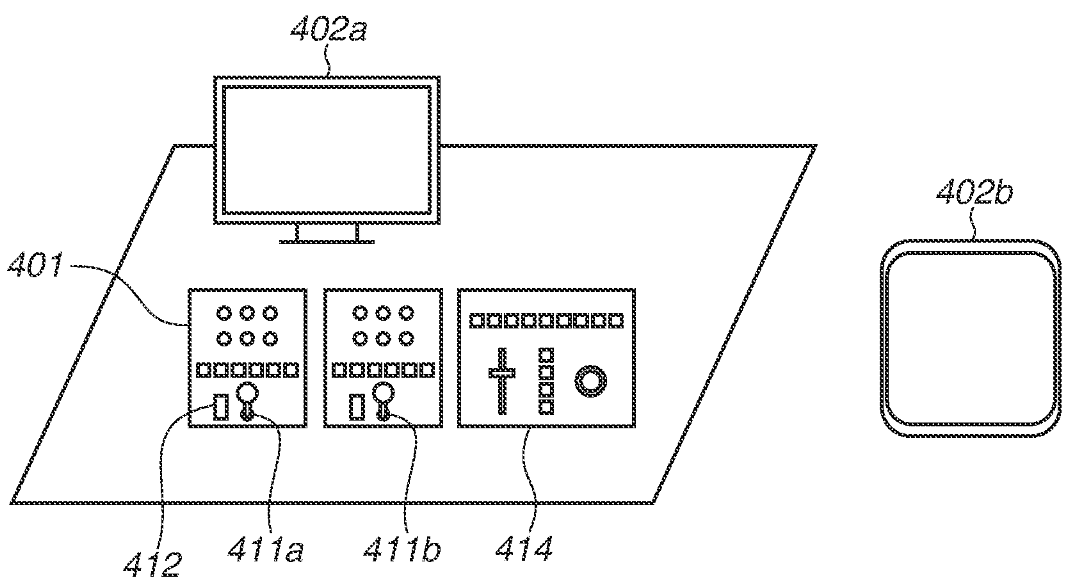
FIG. 4 is a diagram illustrating an input/output unit included in an information processing apparatus.

FIG. 4 is a diagram illustrating an input/output unit included in the information processing apparatus 103.

The input/output unit includes an input unit 401 and a display unit 402 for controlling the virtual camera and making settings regarding the imaging spaces.

The input unit 401 includes a joystick 411*a*, a joystick 411*b*, a seesaw switch 412, and a button group 414. The user (the operator who operates the virtual camera) changes the camera parameters of the virtual camera by operating these components. Each of the joysticks 411*a* and 411*b* has an operation shaft with three degrees of freedom, and the user operates the position of the virtual camera using the joystick 411*a* and the orientation of the virtual camera using the joystick 411*b*. The user changes the value of the focal length or the zoom of the virtual camera by bringing down the seesaw switch 412 to a positive side or a negative side. Additionally, the input unit 401 includes an input unit (not illustrated) for making settings regarding the virtual spaces. For example, this input unit is a keypad or a mouse, and the user performs a key input operation or an icon clicking operation to set the transformation of the virtual spaces and/or switch modes. The camera parameters of the virtual camera are calculated based on the amount of operation received by the input unit 401.

The display unit 402 includes a plurality of display units, namely a user display unit 402*a* on which the user operates the virtual camera and a viewing display unit 402*b* on which the viewer views a virtual viewpoint image. The display unit 402 displays a virtual viewpoint image generated by the image processing apparatus 102, the state of the virtual camera, and an image for generating a transformed virtual space. For example, the user display unit 402*a* is a display, and the viewing display unit 402*b* is a smartphone or a tablet.

The input/output unit illustrated in FIG. 4 is merely an example, and the configuration of the input/output unit is not limited in the present disclosure. For example, a configuration may be employed in which the user uses both the user display unit 402*a* and the viewing display unit 402*b*.

<Functional Configuration>

FIGS. 5A and 5B are diagrams illustrating the functional configuration of the image processing apparatus 102.

The image processing apparatus 102 receives a plurality of captured images obtained by synchronous imaging from the imaging system 101 and the camera parameters from the information processing apparatus 103 and generates a virtual viewpoint image. The functions included in the image processing apparatus 102 will be described in order.

FIG. 5A is a block diagram illustrating an example of the functional configuration of the image processing apparatus 102. The image processing apparatus 102 includes a background model information management unit 501, a coordinate transformation value calculation unit 502, a foreground model information acquisition unit 503, an imaging space transformation unit 504, a transformed image generation unit 506, a camera operation transformation unit 507, and a virtual viewpoint image generation unit 508.

The background model information management unit 501 manages main background model information. The main background model information is a data group of three-dimensional positions obtained by defining the three-dimensional shape of and/or line information regarding a main background model in the world coordinate system (x, y, z). The line information indicates, for example, the shape and the position of a line drawn on a background model, such as a sprinters line of a track of a velodrome, a lane line of a running track, or a start line. The acquired main background model information is transmitted to the coordinate transformation value calculation unit 502, the imaging space transformation unit 504, and the virtual viewpoint image generation unit 508. The background model information management unit 501 may manage both the main background model information regarding the main background model in a main imaging space and transformed background model information regarding a transformed background model in a transformed imaging space.

The coordinate transformation value calculation unit 502 receives the main background model information from the background model information management unit 501 and acquires deformation information held in the RAM 303 or the auxiliary storage device 304. The deformation information is information for determining into what shape the main background model is to be deformed, and generating a deformed background model. The coordinate transformation value calculation unit 502 deforms the main background model based on the deformation information to generate a deformed background model. Further, the coordinate transformation value calculation unit 502 compares a reference line in the main background model and a reference line in the deformed background model to calculate the correspondence relationship between the three-dimensional positions of the main background model and the deformed background model in imaging spaces where the main background model and the deformed background model are arranged. More specifically, the three-dimensional position of the main background model in the main imaging space where the main background model is placed and the three-dimensional position of the deformed background model in a transformed imaging space having a correspondence relationship with the three-dimensional position of the main background model are determined, and the three-dimensional positions of the main background model and the deformed background model are recorded in association with each other. In the present exemplary embodiment, the correspondence relationships between all three-dimensional positions in a space obtained by surrounding the main background model by a bounding box and three-dimensional positions in the transformed imaging space are recorded. These correspondence relationships are recorded as coordinate transformation values. Deformed background model information indicating three-dimensional shape data of the generated deformed background model and the coordinate transformation values are transmitted to the imaging space transformation unit 504.

The foreground model information acquisition unit 503 acquires foreground model information from a foreground model of a subject generated based on a plurality of images and parameters, such as the positions and the orientations of the imaging apparatuses received from the imaging system 101. The foreground model information includes shape information indicating the shape of the foreground model and position information and orientation information regarding the subject. The acquired foreground model information is transmitted to the imaging space transformation unit 504 and the virtual viewpoint image generation unit 508.

The imaging space transformation unit 504 acquires the background model information from the background model information management unit 501 and the foreground model information from the foreground model information acquisition unit 503. The imaging space transformation unit 504 generates, based on the deformed background model information and the coordinate transformation values acquired from the coordinate transformation value calculation unit 502, a transformed imaging space where the deformed background model and the foreground model are arranged. Information regarding the generated transformed imaging space is transmitted to the transformed image generation unit 506.

A virtual camera operation unit 505 acquires input information about an input provided to the input unit 401 by the user, which is received from the input unit 401, and acquires the camera parameters, such as the position and the orientation of the virtual camera in each frame. These camera parameters are transmitted to the transformed image generation unit 506 and the camera operation transformation unit 507. In the present exemplary embodiment, it is assumed that while a virtual viewpoint image generated by the transformed image generation unit 506 is displayed on the user display unit 402*a*, the user operates the virtual camera operation unit 505 with reference to the virtual viewpoint image. The user can select whether to operate the virtual camera in the main imaging space or operate the virtual camera in the transformed imaging space with an operation described below in conjunction with FIGS. 14A and 14B.

The transformed image generation unit 506 acquires the camera parameters from the virtual camera operation unit 505 and generates a virtual viewpoint image viewed from the position and the orientation of the virtual camera in the transformed imaging space generated by the imaging space transformation unit 504. The generated virtual viewpoint image is transmitted to the information processing apparatus 103 and displayed on the user display unit 402*a*.

The camera operation transformation unit 507 transforms the camera parameters acquired from the virtual camera operation unit 505 into the main imaging space based on the coordinate transformation values acquired from the coordinate transformation value calculation unit 502. The transformed camera parameters are transmitted to the virtual viewpoint image generation unit 508.

The virtual viewpoint image generation unit 508 acquires the camera parameters transformed from the transformed imaging space into the main imaging space from the camera operation transformation unit 507. The virtual viewpoint image generation unit 508 generates a virtual viewpoint image viewed from the position and the orientation of the virtual camera in the main imaging space. The generated virtual viewpoint image is transmitted to the information processing apparatus 103 and displayed on the viewing display unit 402*b*.

FIG. 5B is a block diagram illustrating an example of the functional configuration of the imaging space transformation unit 504.

The imaging space transformation unit 504 includes a foreground model coordinate transformation unit 509 and a transformed space generation unit 510.

The foreground model coordinate transformation unit 509 acquires the foreground model information from the foreground model information acquisition unit 503 and the coordinate transformation values from the coordinate transformation value calculation unit 502. The foreground model coordinate transformation unit 509 transforms the position and/or the orientation of the foreground model based on the coordinate transformation values acquired from the coordinate transformation value calculation unit 502. Information regarding the transformed foreground model is transmitted to the transformed space generation unit 510.

The transformed space generation unit 510 acquires the deformed background model information from the coordinate transformation value calculation unit 502 and the information regarding the deformed foreground model from the foreground model coordinate transformation unit 509. The transformed space generation unit 510 generates a transformed imaging space including the foreground model and the deformed background model. Information regarding the generated transformed imaging space is transmitted to the transformed image generation unit 506.

Figure 6A:
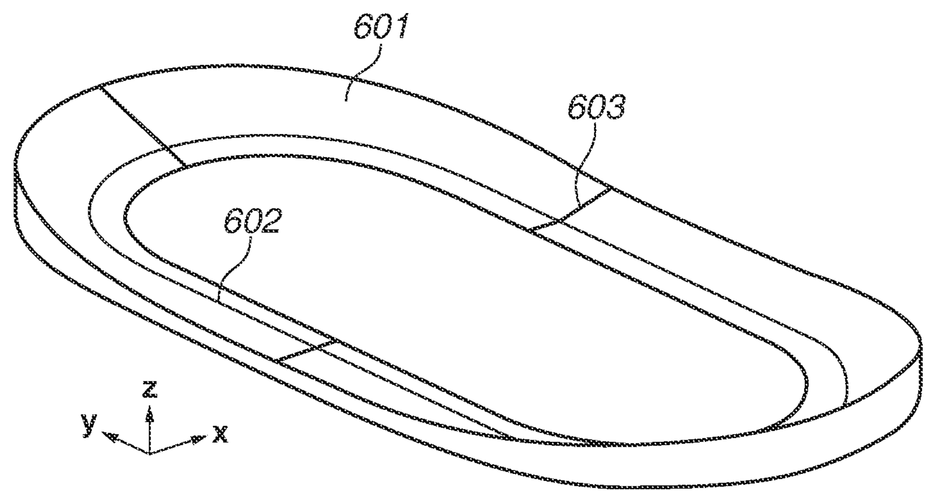
FIGS. 6A to 6D are diagrams illustrating a deformed background model.
Figure 6B:
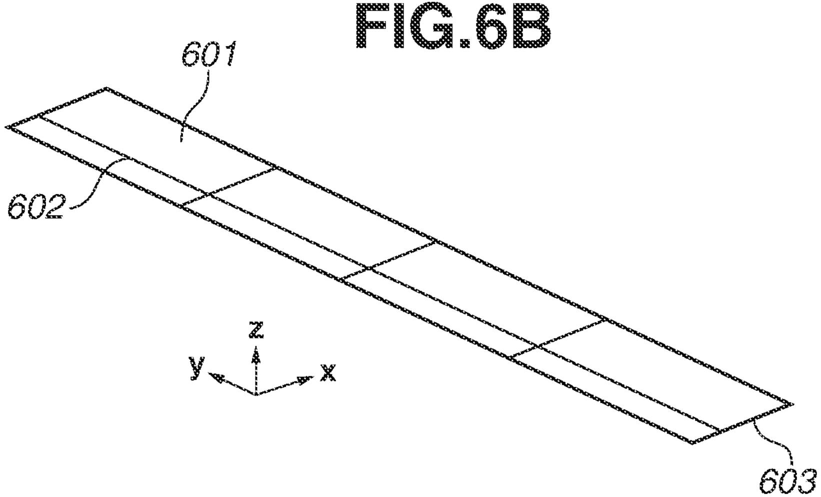
Figure 6C:
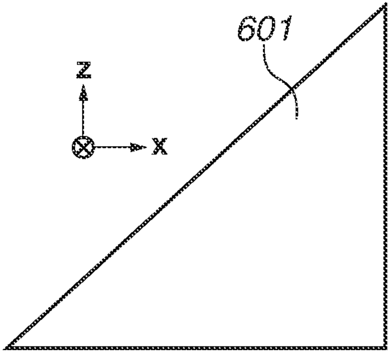
Figure 6D:
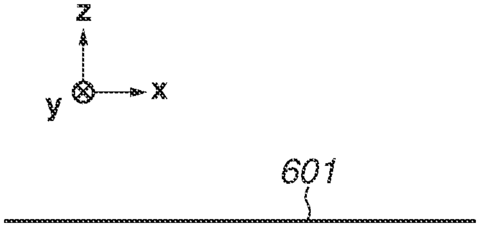

FIGS. 6A to 6D are diagrams illustrating the deformation of the main background model. FIGS. 6A to 6D illustrate an example of the deformation of the main background model, and the example of FIGS. 6A to 6D illustrates how a track 601 including banked surfaces, curved portions, and straight portions with variations in banking angle is deformed into a flat straight line. FIGS. 6A and 6B are perspective views of the main background model and the deformed background model, respectively. FIGS. 6C and 6D are sectional views of the main background model and the deformed background model on a plane passing through a start line 603 and parallel to a z-x plane. In the main background model, the heights (in the z-axis direction) of a sprinters line 602 and the start line 603 change according to the banking angle of the track 601, depending on the position. However, in the deformed background model, the heights of the sprinters line 602 and the start line 603 are constant (z=0), regardless of the position. The sprinters line 602 in the main background model does not have an end portion, and includes curved portions and straight portions. The deformed background model, however, is a straight line of which an end portion is the start line 603. In a case where the user operates the virtual camera to capture the foreground model arranged in the main imaging space, the user needs to change the position and the orientation of the virtual camera according to the banked surfaces, the curved portions, and the straight portions with variations in banking angle in the main background model. Specifically, five axes, namely the X-axis, the Y-axis, the Z-axis, the pan axis, and the tilt axis, of the virtual camera are to be adjusted in each frame. Thus, it is difficult to operate the virtual camera. In contrast, in a case where the user operates the virtual camera to capture the foreground model placed in the deformed background model, the user can capture the foreground model by only providing an input along the Y-axis because the foreground model moves on the straight line. Thus, the user can easily operate the virtual camera on the generated deformed background model. Only facilitating of an operation of the user on the virtual camera is sufficient, and the deformed background model is not limited to a straight line. In a case where control of the virtual camera is limited to a circular trajectory, the deformed background model is deformed into a circle. As described above, the shape of the deformed background model may be determined by an operation on the input unit 401 and the method for calculating the camera parameters in association with the operation, in other words, the method for controlling the virtual camera.

Figure 7:
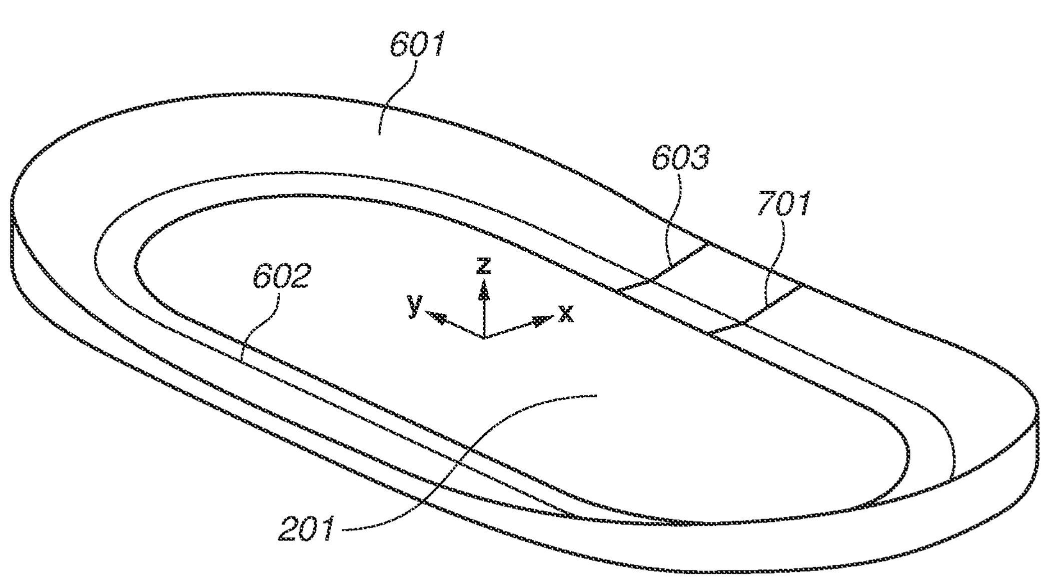
FIG. 7 is a diagram illustrating background model information.

FIG. 7 is a diagram illustrating the main background model information.

The main background model information is a data group of three-dimensional positions obtained by defining three-dimensional shape data of and line information regarding the main background model in the world coordinate system (x, y, z). The three-dimensional shape data includes information regarding surfaces included in the main background model. The position of the three-dimensional shape is represented in the world coordinate system (x, y, z) with the center of the field 201 serving as the origin. A surface included in a background model is not limited to a flat surface, and may be a curved surface such as a curved portion of the track 601. A single surface may be divided into a plurality of surfaces, for example, by dividing a surface into inside and outside the sprinters line 602. The main background model information includes information (line information) regarding a line representing the feature of a competition or the main background model. The line representing the feature of the competition or the main background model is, for example, a line that serves as some reference in the competition, such as the sprinters line 602, the start line 603, or a 30-meter line 701 in a bicycle competition. The line information is represented in the world coordinate system (x, y, z) with the center of the field 201 serving as the origin. The line information may not necessarily indicate an existing line, and may include an imaginary line set by the user.

FIG. 8 is an example of a table that manages the deformation information. The deformation information includes a deformed background model identifier (ID), reference information, and deformed shape information.

Regarding the deformed background model generated by deforming the main background model, a unique ID is set to each deformed background model.

Among the line information and the three-dimensional shape data included in the main background model information, information regarding lines and a surface that serve as references in calculating coordinate transformation values for transforming the background model into a predetermined shape is included in the reference information. The reference information includes a reference line, a starting line, and a reference surface.

The reference line serves as a guide for the transformation of the main background model. To calculate the coordinate transformation values, initially, the coordinate transformation values of the reference line are calculated, and then the coordinate transformation values for the three-dimensional positions included in the main background model are calculated using the reference line as a reference. The starting line is used for defining the starting point of the deformation. For example, in a case where a background model that does not have an end portion, such as a circle, is deformed into a shape having an end portion, such as a straight line shape, the background model is deformed so that a line specified as the starting line is the end portion. The reference surface serves as a reference for the deformation, and defines the amount of deformation in the height direction.

The deformed shape information defines into what shape the main background model is to be deformed. The deformed shape information includes shape information and a line length ratio. The shape information includes reference line deformation and reference surface deformation and defines the shape of the deformed background model, such as a flat straight line. The line length ratio defines an enlargement or a reduction in the length of a straight line after deformation. For example, in a case where a track having a perimeter of 400 meters is deformed into a straight line shape, and if the line length ratio is 1, the track is deformed so that the length of the straight line is 400 meters, which is the same as before the deformation. If the line length ratio is 0.5, the length of the straight line is reduced to 200 meters. The line length ratio can be specified in each of a tangent direction and a normal direction.

The configuration of the deformed background model information management table is not limited to this. For example, the deformed background model information management table may include the foreground model information. In this case, the velocity of the foreground model included in the foreground model information may be acquired, and the foreground model may be set to be transformed so that the velocity of the foreground model is constant in the transformed imaging space.

Figures 9A, 9B:
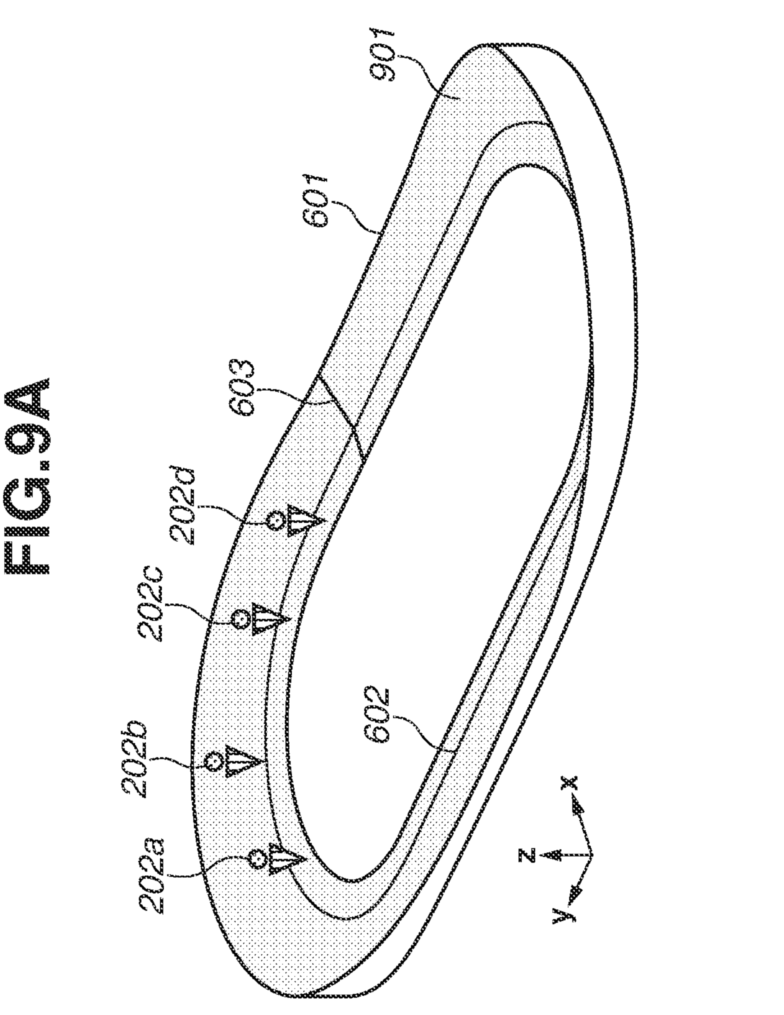
FIGS. 9A and 9B are diagrams illustrating a background model and a deformed background model.

FIGS. 9A and 9B are diagrams illustrating the main background model and the deformed background model.

FIGS. 9A and 9B are diagrams illustrating the main background model and the deformed background model, respectively. In the example of FIG. 8, "track_A velodrome" is registered as the deformed background model ID. Thus, the main background model that serves as a reference for the deformation is specified as the track 601, and background model information regarding the track 601 is referred to, for calculation of coordinate transformation values. In the reference information, "sprinters line" is registered as the reference line, "start line" is registered as the starting line, and "track upper surface" is registered as the reference surface. The reference line "sprinters line", the starting line "start line", and the reference surface "track upper surface" indicate the sprinters line 602, the start line 603, and a track upper surface 901, respectively. The track upper surface 901 is a hatched surface in FIG. 9A. The main background model is deformed with the start line 603 as an end portion. For the shape information in the deformed shape information, "straight line" is registered as the reference line deformation, and "z'=0" is registered as the reference surface transformation. At this time, the prime symbol (') indicates a coordinate in the transformed imaging space. "z'=0" indicates that the three-dimensional positions are transformed (onto an XY plane) so that a z' coordinate on "track upper surface" set as the reference surface is always 0. "Straight line" indicates that the track 601 is deformed into a straight line. In other words, the track 601 is deformed into a flat straight line shape. At this time, in a competition where a person moves around in the same place, such as the cycling competition, the deformed background model may be generated by linearly connecting courses for moving around in the main background model. Thus, when the cyclist 202 enters the next lap, the cyclist 202 seamlessly moves without shifting to a distant position (from the end to the beginning of the deformed background model). The line length ratio is set to "0.8" in the tangent direction and "1.0" in the normal direction. Since the line length ratio in the tangent direction is 0.8, the main background model is deformed into a straight line having a length 0.8 times the circumferential length of the sprinters line 602 in FIG. 9A. Since the line length ratio in the normal direction is 1.0, the width of the track 601 has the same value before and after the deformation.

Figure 10A:
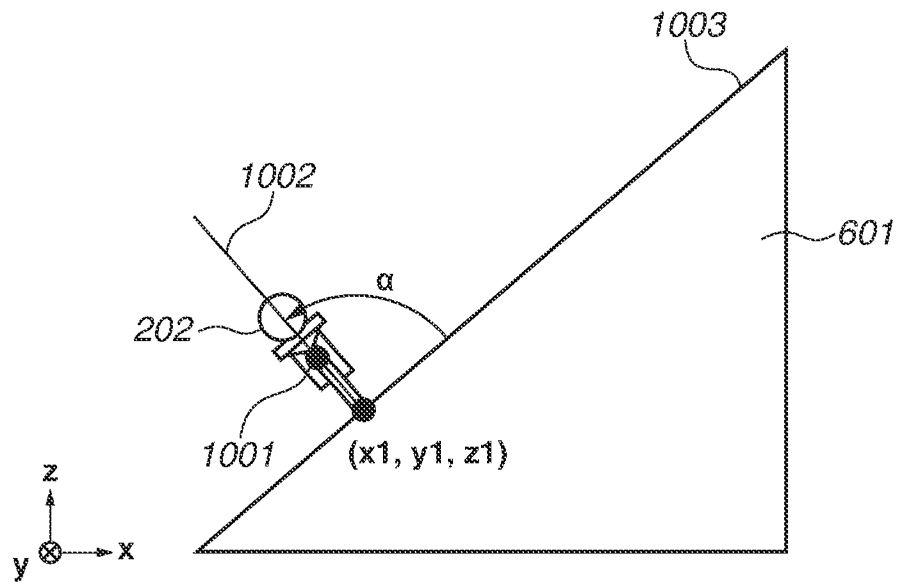
FIGS. 10A and 10B are diagrams illustrating transformation of a position and an orientation of a foreground model.
Figure 10B:
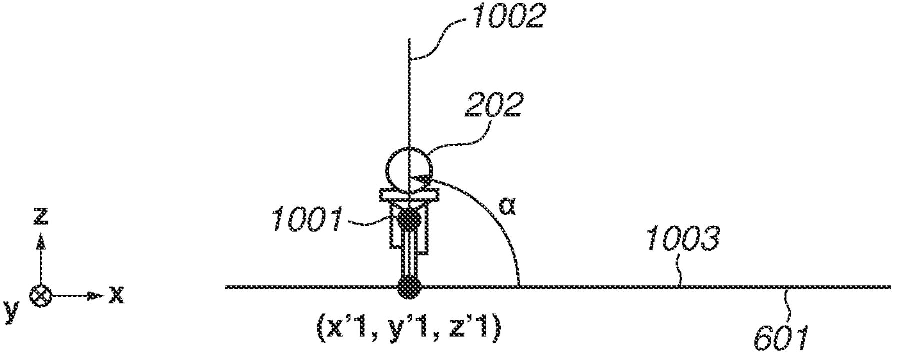

FIGS. 10A and 10B are diagrams illustrating the transformation of the position and the orientation of the foreground model.

FIGS. 10A and 10B indicate the main imaging space and the transformed imaging space, respectively. The three-dimensional position and the orientation of the foreground model in FIG. 10A are transformed into those of the foreground model in FIG. 10B.

In the transformation of the position and the orientation of the foreground model in the transformed imaging space, the position and the orientation of the foreground model are transformed using the coordinate transformation values of the three-dimensional positions in the main imaging space. In the example of FIGS. 10A and 10B, a three-dimensional position (xi, yi, zi) on the track 601 in the main imaging space is transformed into a position (x'i, y'i, z'i) in the transformed imaging space. At this time, the cyclist 202 located at the three-dimensional position (xi, yi, zi) is arranged at (transformed into) the position (x'i, y'i, z'i) in the transformed imaging space. The orientation of the cyclist 202 is transformed so that an angle α between a straight line 1002 connecting the three-dimensional position on the track 601 where the cyclist 202 is located and a center point 1001 of the cyclist 202 and a reference surface 1003 is equal between the main imaging space and the transformed imaging space. At this time, in the example of FIGS. 10A and 10B, the reference surface 1003 is the track upper surface. The three-dimensional position of the foreground model is set to the position of the center of the coordinates where the foreground model and the background model are in contact with each other. The center of the foreground model is approximated by the center of a bounding box surrounding the foreground model. However, the method for approximating the three-dimensional position of the foreground model on the background model where the foreground model is located or the center of the foreground model is not limited to this. When the imaging space is transformed based on the deformation information illustrated in the example of FIG. 8, the track 601 including the banked surfaces and the curved portions with variations in banking angle is deformed into a flat straight line, and the foreground model of the cyclist 202 is arranged based on the deformation. Thus, a transformed imaging space in which the cyclist 202 cycles straight on a straight track is generated. The user operates the position and/or the orientation of the virtual camera in the transformed imaging space obtained through such transformation, and the camera operation transformation unit 507 transforms a result of the operation on the virtual camera into the position and/or the orientation of the virtual camera in the main imaging space. The transformation of the operation on the virtual camera will be described below.

FIG. 11 is a flowchart illustrating the processing of the image processing apparatus 102.

In step S1101, the background model information management unit 501 acquires main background model information from the RAM 303 or the auxiliary storage device 304 included in the image processing apparatus 102.

In step S1102, the coordinate transformation value calculation unit 502 receives the main background model information from the background model information management unit 501 and generates a deformed background model based on deformation information stored in the RAM 303 or the auxiliary storage device 304. The coordinate transformation value calculation unit 502 then calculates coordinate transformation values from the generated deformed background model and the main background model.

In step S1103, the foreground model information acquisition unit 503 acquires foreground model information generated based on a plurality of images and parameters, such as the positions and the orientations of the imaging apparatuses received from the imaging system 101.

In step S1104, the user performs, using the input unit 401, the operation of selecting whether to capture a virtual viewpoint image by operating the virtual camera in a transformed imaging space. Hereinafter, the mode of capturing a virtual viewpoint image by operating the virtual camera in a transformed imaging space will be referred to as a "transformed imaging space mode". If the transformed imaging space mode is on (YES in step S1104), the processing proceeds to step S1105. If the transformed imaging space mode is off (NO in step S1104), the processing proceeds to step S1111.

In step S1105, the imaging space transformation unit 504 receives the deformed background model information from the coordinate transformation value calculation unit 502 and the foreground model information from the foreground model information acquisition unit 503. The imaging space transformation unit 504 generates a transformed imaging space where the deformed background model and the foreground model are placed.

In step S1106, the virtual camera operation unit 505 acquires input information about an input provided to the input unit 401 by the user, which is received from the input unit 401, and acquires the camera parameters indicating the position and the orientation of the virtual camera in each frame.

In step S1107, the transformed image generation unit 506 acquires the deformed background model information and the foreground model information from the imaging space transformation unit 504 and the camera parameters of the virtual camera from the virtual camera operation unit 505. The transformed image generation unit 506 generates a virtual viewpoint image including the deformed background model and the foreground model viewed from the position and the orientation of the virtual camera in the transformed imaging space.

In step S1108, the camera operation transformation unit 507 transforms the camera parameters acquired from the virtual camera operation unit 505 into the coordinate system in the main imaging space based on the coordinate transformation values acquired from the coordinate transformation value calculation unit 502.

In step S1109, the virtual viewpoint image generation unit 508 acquires the main background model information from the background model information management unit 501 and the foreground model information from the foreground model information acquisition unit 503.

The virtual viewpoint image generation unit 508 acquires the camera parameters transformed into the main imaging space from the camera operation transformation unit 507. The virtual viewpoint image generation unit 508 generates a virtual viewpoint image including the main background model and the foreground model viewed from the position and the orientation of the virtual camera in the main imaging space.

In step S1110, it is determined whether an instruction to end the work of the information processing apparatus 103 has been provided. If an instruction to end the work has not been provided (NO in step S1110), the processing returns to step S1103, and the processes are repeated. If an instruction to end the work has been provided (YES in step S1110), the processing is ended.

In step S1111, the virtual camera operation unit 505 acquires input information that has received from the input unit 401 and corresponds to an input provided by the user and acquires the camera parameters indicating the position and the orientation of the virtual camera in each frame. Thus, if the transformed imaging space mode is off, the user operates the virtual camera in the main imaging space to capture a virtual viewpoint image.

Figures 12A, 12B:
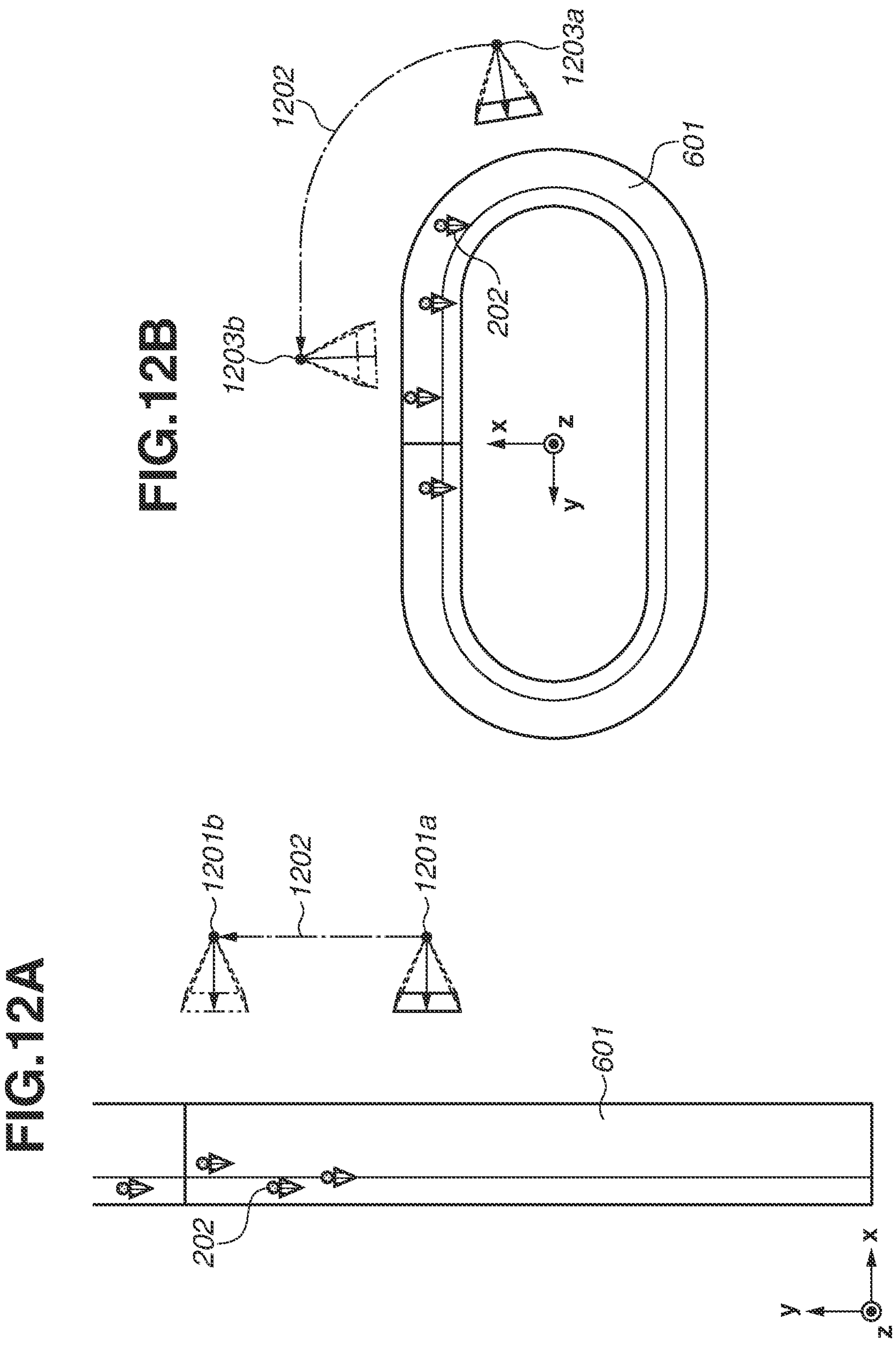
FIGS. 12A and 12B are diagrams illustrating an example of an operation on a virtual camera in the transformed imaging space.

FIGS. 12A and 12B are diagrams illustrating an example of the operation on the virtual camera in the transformed imaging space.

FIG. 12A is a plan view of the transformed imaging space. FIG. 12B is a plan view of the main imaging space. In the example of FIGS. 12A and 12B, the track 601 including the banked surfaces and the curved portions with variations in banking angle is deformed into a flat straight line, and the foreground model of the cyclist 202 is placed on the deformed background model. If the transformed imaging space mode is on, the user operates the virtual camera in the transformed imaging space, and the result of the operation on the virtual camera is reflected on the main imaging space. The camera parameters in the transformed imaging space are transformed into the camera parameters in the main imaging space based on the coordinate transformation values calculated by the coordinate transformation value calculation unit 502, thus transforming the operation on the virtual camera.

In FIGS. 12A and 12B, the position of a virtual camera 1201 and a trajectory 1202 correspond to each other. In other words, when the user moves the virtual camera 1201 from a position 1201*a* to a position 1201*b* illustrated in FIG. 12A by operating the virtual camera 1201 in the transformed imaging space, the virtual camera 1201 moves from a position 1203*a* to a position 1203*b* illustrated in FIG. 12B in the main imaging space. For example, in a case where the virtual camera 1201 is linearly translated along the straight track 601 in the transformed imaging space as illustrated in FIG. 12A, the linear translation of the virtual camera 1201 is transformed into a movement along a curve of the track 601 in the main imaging space as illustrated FIG. 12B. In a case where the user performs the operation of moving the virtual camera 1201 along the shape of the track 601 in the main imaging space, the user needs to perform the operation of moving the position of the virtual camera 1201 while operating the orientation of the virtual camera 1201 according to the banked surfaces and the curved portions which are included in the track 601 and which vary in banking angle, and this operation is cumbersome. In contrast to this, if the user operates the position and/or the orientation of the virtual camera 1201 in the transformed imaging space including the deformed background model obtained by deforming the track 601 into a simple shape, and the result of the operation is reflected on the main imaging space, the user can realize a complex motion of the camera by a simple operation.

FIGS. 13A to 13D are diagrams illustrating the transformation of the camera parameters of the virtual camera.

FIGS. 13A to 13D illustrate the deformed background model in a case where the main background model is deformed so that the track 601 including the banked surfaces and the curved portions with variations in banking angle is a flat straight line. The camera parameters of the virtual camera in the transformed imaging space are transformed into the camera parameters of the virtual camera in the main imaging space using the coordinate transformation values of the three-dimensional positions in the background model information.

Figures 13A, 13B, 13C, 13D:
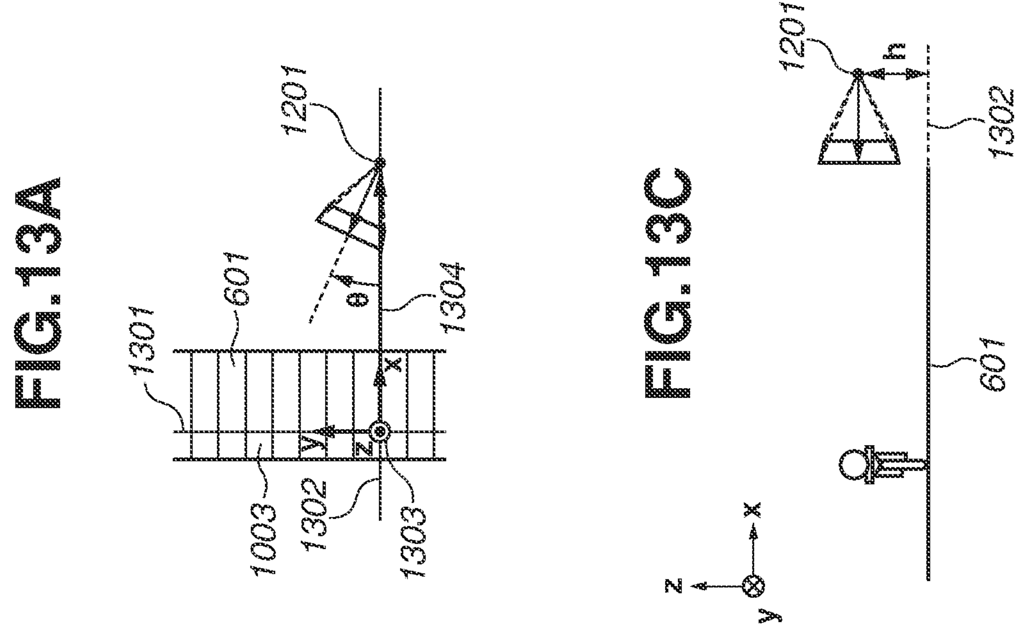
FIGS. 13A to 13D are diagrams illustrating transformation of camera parameters of a virtual camera.

FIG. 13A is a plan view of the transformed imaging space. FIG. 13B is a plan view of the main imaging space. The transformation of the camera parameters of the virtual camera is defined using a normal to the reference line.

The normal to the reference line is a line on the reference surface 1003 illustrated in FIGS. 10A and 10B or on a surface parallel to the reference surface 1003. For example, in a case where the virtual camera 1201 is present on a normal 1302 to a reference line 1301 illustrated in FIG. 13A, the camera parameters of the virtual camera 1201 are transformed so that the virtual camera 1201 is present on the normal 1302 to the reference line 1301 illustrated in FIG. 13B in the transformed imaging space. At this time, the normal 1302 illustrated in FIG. 13B is deformed into the normal 1302 illustrated in FIG. 13A by the deformation of the background model.

Regarding the position of the virtual camera 1201, the camera parameters are transformed using as a reference a vector 1304 of which the starting point is an intersection point 1303 of the reference line 1301 and the normal 1302 and the ending point is the position coordinates of the virtual camera 1201. The camera parameters are transformed so that in a three-dimensional orthogonal coordinate system (a right-hand system) of which the origin is the intersection point 1303 and two axes are the tangent direction and the normal direction of the reference line 1301 passing through the intersection point 1303, the value of the vector 1304 is equal between the main imaging space and the transformed imaging space.

Regarding the orientation of the virtual camera 1201, the camera parameters are transformed so that the angle between the normal 1302 and the optical axis of the virtual camera 1201 is equal between the main imaging space and the transformed imaging space. FIGS. 13A and 13B are diagrams illustrating the transformation of the camera parameters at the angle of the pan axis. An angle θ of the pan axis between the normal 1302 and the optical axis of the virtual camera 1201 is equal between the main imaging space and the transformed imaging space.

FIG. 13C is a sectional view of the transformed imaging space. FIG. 13D is a sectional view of the main imaging space. A distance h between the virtual camera 1201 and the normal 1302 to the reference line and the angle of the tilt axis between the normal 1302 and the optical axis of the virtual camera 1201 are equal between the main imaging space and the transformed imaging space. FIGS. 13C and 13D are diagrams illustrating the transformation of the camera parameters at the angle of the tilt axis. The track 601 having a banking angle φ illustrated in FIG. 13D is deformed into a flat shape (having a banking angle of 0) illustrated in FIG. 13C. The banking angle φ is the angle between the normal 1302 and a plane horizontal to the ground. In a case where the camera parameters of the virtual camera 1201 in the transformed imaging space illustrated in FIG. 13C are transformed into the camera parameters of the virtual camera 1201 in the main imaging space illustrated in FIG. 13D, the angle of the tilt axis of the virtual camera 1201 changes (is directed downward) by φ.

Figure 14B:
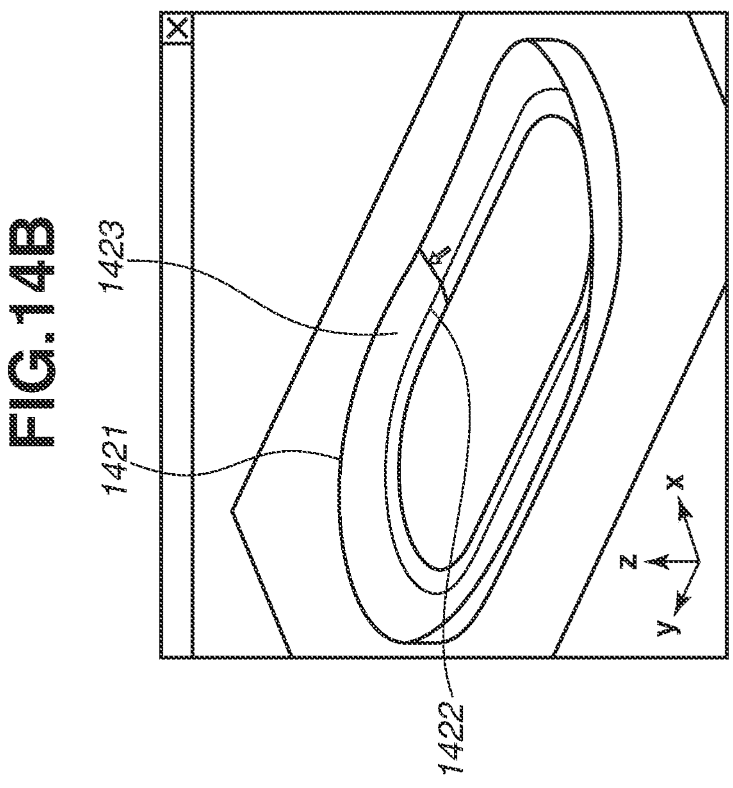
FIGS. 14A and 14B are diagrams illustrating examples of user interface (UI) screens for setting the transformed imaging space.
Figure 14A:
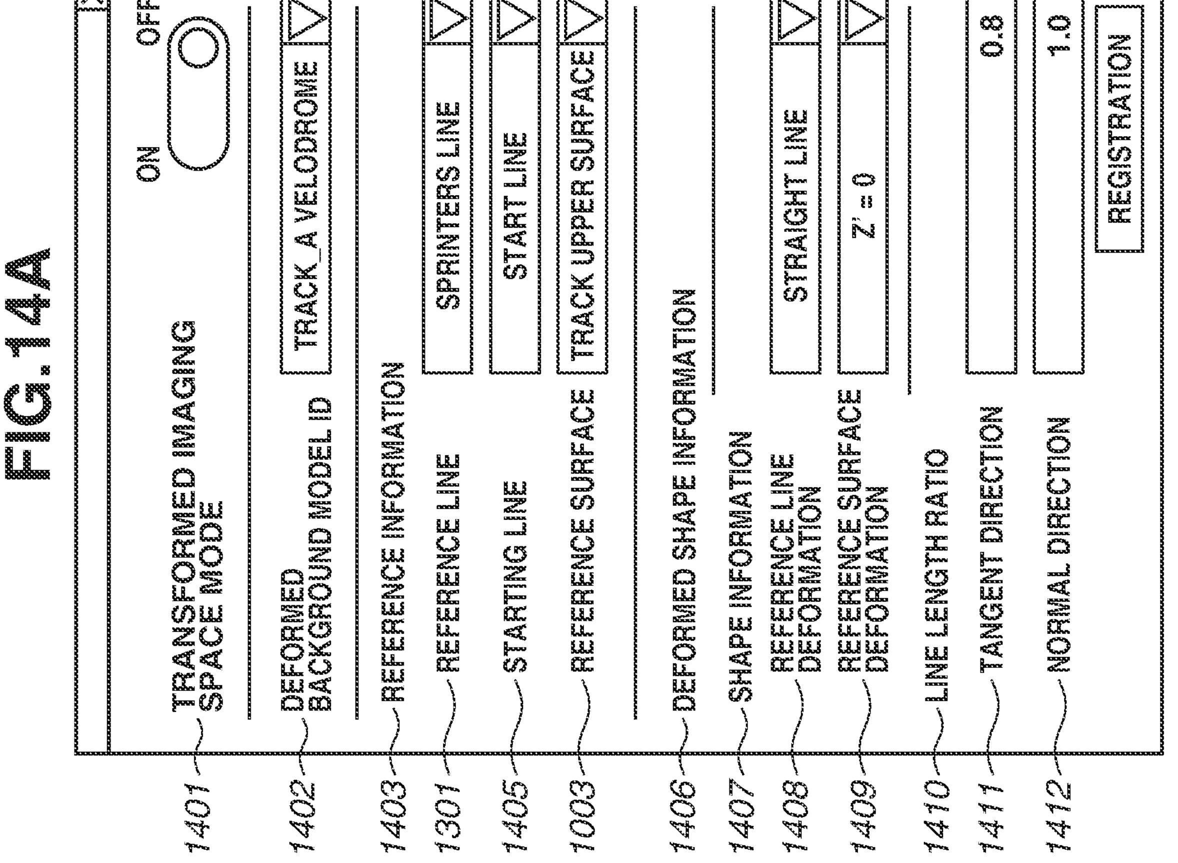

FIGS. 14A and 14B are diagrams illustrating examples of user interface (UI) screens for setting the transformed imaging space.

The settings of the transformed imaging space are implemented by the user operating the input unit 401 illustrated in FIG. 4.

The user display unit 402*a* includes screens for performing the operation of setting the transformed imaging space illustrated in FIGS. 14A and 14B, and the user edits and registers the deformation information while operating the screens displayed on the user display unit 402*a*.

FIG. 14A is a screen for editing and registering the deformation information. FIG. 14B is a screen for editing background model information registered in the deformation information. The screen in FIG. 14B displays a background model present in an imaging space. The user inputs a deformed background model ID 1402, reference information 1403, and deformed shape information 1406 and sets a transformed imaging space mode 1401 to on or off.

The deformed background model ID 1402 is input by selecting a background model 1421 from the editing screen illustrated in FIG. 14B or selecting a background model from a pull-down menu illustrated in FIG. 14A. In a case where the background model 1421 to be registered for the deformed background model ID 1402 is selected from the editing screen illustrated in FIG. 14B, the background model 1421 is selected by a click operation.

The user sets the reference line 1301, a starting line 1405, and the reference surface 1003 as the reference information 1403. The reference line 1301 and the starting line 1405 are input by selecting a line 1422 and a start line on the background model 1421 from the editing screen illustrated in FIG. 14B or selecting lines from pull-down menus illustrated in FIG. 14A. The reference surface 1003 is input by selecting a surface 1423 on the background model 1421 from the editing screen illustrated in FIG. 14B or selecting a surface from a pull-down menu illustrated in FIG. 14A. In a case where the line 1422, the start line, and the surface 1423 to be registered for the deformed background model ID 1402 are selected from the editing screen illustrated in FIG. 14B, the line 1422, the start line, and the surface 1423 are selected by click operations.

The deformed shape information 1406 includes shape information 1407 and a line length ratio 1410. The user sets reference line deformation 1408 and reference surface transformation 1409 as the shape information 1407 and sets a tangent direction 1411 and a normal direction 1412 as the line length ratio 1410. The reference line deformation 1408 and the reference surface transformation 1409 are input by selecting options from pull-down menus illustrated in FIG. 14A. The tangent direction 1411 and the normal direction 1412 are input by inputting numerical values by operating the keyboard.

The transformed imaging space mode 1401 is set by selecting either "on" or "off". If the transformed imaging space mode 1401 is on, the user operates the virtual camera in the transformed imaging space. If the transformed imaging space mode 1401 is off, the user operates the virtual camera in the main imaging space.

The set deformation information is stored in the RAM 303 or the auxiliary storage device 304 by the user pressing a registration button illustrated in FIG. 14A.

In the present exemplary embodiment, a main background model as a field of a competition is deformed into a deformed background model having a simple shape, and a transformed imaging space where the deformed background model and a foreground model are placed is generated. A user operates the position and/or the orientation of a virtual camera in the transformed imaging space. The camera parameters of the virtual camera in the transformed imaging space are transformed into the camera parameters of the virtual camera in a main imaging space based on coordinate transformation values generated based on the main background model and the deformed background model. Thus, the user only needs to operate the virtual camera according to the background model having the simple shape and the movement of the foreground model, and can simply operate a complex and difficult motion of the camera.

In the present exemplary embodiment, a main imaging space including a main background model generated from a plurality of captured images and a transformed imaging space for facilitating an operation on a virtual camera in the main imaging space are generated. The present disclosure, however, is not limited to this. For example, the main background model generated from the plurality of captured images and a deformed background model may be placed next to each other in the main imaging space. In this case, coordinate transformation values are calculated based on the positional relationship between the main background model and the deformed background model, and another virtual camera is generated by changing the camera parameters of the virtual camera based on a received user operation based on the coordinate transformation values.

In the present exemplary embodiment, a transformed imaging space is generated by the image processing apparatus 102. The present disclosure, however, is not limited to this. For example, a transformed imaging space may be generated by the information processing apparatus 103. In this case, the coordinate transformation value calculation unit 502, the imaging space transformation unit 504, the transformed image generation unit 506, and the camera operation transformation unit 507 are included in the information processing apparatus 103. Thus, the camera parameters of the virtual camera in the main imaging space are transmitted from the information processing apparatus 103 to the image processing apparatus 102, regardless of whether the transformed imaging space mode is on or off.

According to the present disclosure, it is possible to improve the operability of a virtual camera in a virtual space including a structure having a complex shape.

OTHER EXEMPLARY EMBODIMENTS

The present disclosure can also be implemented by the process of supplying a program for achieving the functions of the above exemplary embodiments to a system or an apparatus via a network or a storage medium, and of causing one or more processors of a computer of the system or the apparatus to read and execute the program. The present disclosure can also be implemented by a circuit (e.g., an ASIC) for achieving one or more functions.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-074205, filed Apr. 28, 2023, which is hereby incorporated by reference herein in its entirety.

What is claimed is:

1. An information processing apparatus comprising:

one or more memories storing instructions; and one or more processors executing the instructions to:

receive, while a first virtual viewpoint image generated based on first three-dimensional shape data corresponding to a structure is displayed, a user operation on a first virtual camera corresponding to the first virtual viewpoint image; and generate, based on the user operation, camera parameters indicating a position and an orientation of a second virtual camera corresponding to a second virtual viewpoint image generated based on second three-dimensional shape data indicating a shape of the structure different from a shape indicated by the first three-dimensional shape data, wherein the second three-dimensional shape data is generated by deforming the first three-dimensional shape data, wherein the first three-dimensional shape data includes a course including a straight portion and a curved portion, and wherein the second three-dimensional shape data includes a course obtained by deforming the course included in the first three-dimensional shape data into a straight line or a circle.

2. The information processing apparatus according to claim 1, wherein the one or more processors execute the instructions further to acquire deformation information based on a user operation, and wherein the second three-dimensional shape data is generated by deforming the first three-dimensional shape data based on the deformation information.

3. The information processing apparatus according to claim 2, wherein the deformation information includes information specifying the shape of the second three-dimensional shape data.

4. The information processing apparatus according to claim 1, wherein the course included in the second three-dimensional shape data is located on an XY plane.

5. The information processing apparatus according to claim 1, wherein the second virtual viewpoint image is output to an apparatus different from an apparatus to which the first virtual viewpoint image is output.

6. The information processing apparatus according to claim 1, wherein the second virtual viewpoint image is generated based on a plurality of captured images acquired through image capturing performed by a plurality of imaging apparatuses.

7. The information processing apparatus according to claim 1, wherein the one or more processors execute the instructions further to output the generated camera parameters to an apparatus that generates the second virtual viewpoint image.

8. An information processing method comprising:

receiving, while a first virtual viewpoint image generated based on first three-dimensional shape data corresponding to a structure is displayed, a user operation on a first virtual camera corresponding to the first virtual viewpoint image; and generating, based on the user operation, camera parameters indicating a position and an orientation of a second virtual camera corresponding to a second virtual viewpoint image generated based on second three-dimensional shape data indicating a shape of the structure different from a shape indicated by the first three-dimensional shape data, wherein the second three-dimensional shape data is generated by deforming the first three-dimensional shape data, wherein the first three-dimensional shape data includes a course including a straight portion and a curved portion, and wherein the second three-dimensional shape data includes a course obtained by deforming the course included in the first three-dimensional shape data into a straight line or a circle.

9. A non-transitory computer readable storage medium storing a computer program, the computer program being executable by a processor and comprising a method of calibrating imaging apparatuses using an image, the method comprising:

receiving, while a first virtual viewpoint image generated based on first three-dimensional shape data corresponding to a structure is displayed, a user operation on a virtual camera corresponding to the first virtual viewpoint image; and generating, based on the user operation, camera parameters indicating a position and an orientation of a virtual camera corresponding to a second virtual viewpoint image generated based on second three-dimensional shape data indicating a shape of the structure different from a shape indicated by the first three-dimensional shape data, wherein the second three-dimensional shape data is generated by deforming the first three-dimensional shape data, wherein the first three-dimensional shape data includes a course including a straight portion and a curved portion, and wherein the second three-dimensional shape data includes a course obtained by deforming the course included in the first three-dimensional shape data into a straight line or a circle.

* * * * *